United States Patent
Kono et al.

(10) Patent No.: US 8,736,206 B2
(45) Date of Patent: May 27, 2014

(54) POWER CONVERTING APPARATUS (75) Inventors: Masaki Kono, Tokyo (JP); Keita Hatanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 395 days.

(21) Appl. No.: 13/256,465

(22) PCT Filed: Apr. 27, 2009

(86) PCT No.: PCT/JP2009/058300
§ 371 (c)(1),
(2), (4) Date: Sep. 14, 2011

(87) PCT Pub. No.: WO2010/125637
PCT Pub. Date: Nov. 4, 2010

(65) Prior Publication Data
US 2012/0001587 A1  Jan. 5, 2012

(51) Int. Cl.
*H02P 21/00* (2006.01)

(52) U.S. Cl.
USPC ............ 318/400.02; 318/400.01; 318/721; 318/799; 318/800; 318/801; 318/727; 318/430; 318/432; 388/800; 363/40; 363/55; 363/109

(58) Field of Classification Search
USPC ......... 318/400.01, 400.02, 400.07, 400.09, 318/400.14, 400.15, 721, 722, 727, 778, 318/779, 799, 800, 801, 808, 809, 811, 812, 318/823, 430, 432, 437, 599; 363/13, 23, 363/40, 55, 109, 152; 388/800, 815, 831
See application file for complete search history.

(56) References Cited

U.S. PATENT DOCUMENTS

| 7,411,370 B2 | 8/2008 | Kono |
| 7,423,395 B2 * | 9/2008 | Iura et al. ................. 318/400.02 |

(Continued)

FOREIGN PATENT DOCUMENTS

| EP | 1 303 035 A1 | 4/2003 |
| EP | 1 796 260 A1 | 6/2007 |

(Continued)

OTHER PUBLICATIONS

International Search Report (PCT/ISA/210) issued on Jun. 16, 2009, by Japanese Patent Office as the International Searching Authority for International Application No. PCT/JP2009/058300.

(Continued)

*Primary Examiner* — Antony M Paul
(74) *Attorney, Agent, or Firm* — Buchanan Ingersoll & Rooney PC (57) ABSTRACT

A power converting apparatus including a power converter that converts a DC voltage into an AC voltage and applies the AC voltage to an AC rotating machine and a control unit that controls the power converter based on an operation command from the outside is provided. The power converting apparatus includes: a first calculating unit that calculates and outputs, from a d-axis current detection value and a q-axis current detection value detected by the AC rotating machine and current command values based on the operation command, first voltage command values to the power converter, magnetic fluxes of the AC rotating machine, and an angular frequency; and a second calculating unit that sets, as an initial value, at least one of the magnetic fluxes and the angular frequency input from the first calculating unit and calculates and outputs second voltage command value to the power converter and an angular frequency.

12 Claims, 6 Drawing Sheets

(56) References Cited

U.S. PATENT DOCUMENTS

2006/0049795 A1    3/2006  Iura et al.
2009/0251083 A1*  10/2009  Kinpara et al. .......... 318/400.11

FOREIGN PATENT DOCUMENTS

| JP | 2000-253505 A | 9/2000 |
| JP | 2002-374699 A | 12/2002 |
| JP | 2003-259699 A | 9/2003 |
| JP | 2003284381 A | 10/2003 |
| JP | 2005-124366 A | 5/2005 |
| JP | 2008-172904 A | 7/2008 |
| RU | 2132110 C1 | 6/1999 |
| RU | 2179515 C2 | 2/2002 |

OTHER PUBLICATIONS

Written Opinion (PCT/ISA/237) issued on Jun. 16, 2009, by Japanese Patent Office as the International Searching Authority for International Application No. PCT/JP2009/058300.

Korean Office Action (Notice of Preliminary Rejection) dated May 28, 2013, issued by the Korean Patent Office in corresponding Korean Patent Application No. 10-2011-7024674, and an English Translation thereof. (7 pgs.).

Office Action (Patent Examination Report No. 1) dated Apr. 17, 2013, issued in corresponding Australian Patent Application No. 2009345453. (4 pages).

European Search Report from European Patent Office dated Jan. 30, 2013, issued in corresponding European Patent Appln. No. 09843981.3 (3 pages).

European Search Opinion from European Patent Office dated Feb. 15, 2013, issued in corresponding European Patent Appln. No. 09843981.3 (4 pages).

Office Action (Decision on Grant a Patent for Invention) dated Nov. 13, 2012, issued by the Russian Patent Office in the corresponding Russian Patent Application No. 2011147899 and an English translation thereof. (13 pages).

* cited by examiner

POWER CONVERTING APPARATUS

FIELD

The present invention relates to a power converting apparatus that is capable of restarting an AC rotating machine or AC rotary machine without using a speed detector, and, more particularly to a power converting apparatus that restarts an AC rotating machine that is in a free rotation (free-run) state with an AC output of the power converting apparatus interrupted by service interruption or the like, in a process from coasting to restart or during operation.

BACKGROUND

When the AC rotating machine in the free-run state not driven by the power converting apparatus is restarted, a frequency, a phase, and an amplitude of an output voltage supplied from the power converting apparatus need to be caused to coincide with a rotation frequency, a residual voltage phase, and an amplitude of the AC rotating machine in the free-run state. If the voltage phases and the amplitudes are different, a large current flows to the power converting apparatus. If the frequencies are different, sudden torque is caused in the AC rotating machine.

As means for solving such a problem, in a related art described in Patent Literature 1, a magnetic-flux-estimation-value correcting unit that corrects a boost of a magnetic flux estimation value in a process from coasting to restart of an electric motor vehicle is provided between an induction-machine-motor model unit that calculates a magnetic flux estimation value and a motor-current estimating unit that receives input of the magnetic flux estimation value from the induction-machine-motor model unit and calculates a current estimation value. Consequently, instability in restarting the AC rotating machine that is in the free-run state is reduced.

CITATION LIST

Patent Literature

Patent Literature 1: Japanese Patent Application Laid-open No. 2002-374699

SUMMARY

Technical Problem

However, in the related art described in Patent Literature 1, appropriate values calculated from a magnetic flux command or the like are set as primary and secondary d-axis magnetic flux estimation values. Therefore, there is a problem in that, when a speed estimation value slightly falls during restart, a voltage on a DC side rises in some case. In the related art described in Patent Literature 1, continuity realized using two speed estimating means is not described.

The present invention has been devised in view of the above and it is an object of the present invention to obtain a power converting apparatus that can further reduce, without using a rotation detector, a torque shock in restarting an AC rotating machine that is in a free-run state.

Solution to Problem

In order to solve the aforementioned problems and attain the aforementioned object, the power converting apparatus is provided with: a power converter that converts a DC voltage into an AC voltage and applies the AC voltage to an AC rotating machine; and a control unit that controls the power converter based on an operation command from an outside, a first calculating unit that calculates and outputs, from current information detected by the AC rotating machine and a current command value based on the operation command, a first voltage command value to the power converter, a magnetic flux of the AC rotating machine, and first speed, which is free-run speed of the AC rotating machine; a second calculating unit that sets, as an initial value, at least one of the first speed and the magnetic flux of the AC rotating machine input from the first calculating unit and calculates and outputs a second voltage command value to the power converter and second speed, which is driving speed of the AC rotating machine.

Advantageous Effects of Invention

According to the present invention, irrespective of whether the AC rotating machine is stopped or is performing free rotation, a value of a voltage command is determined according to a control mode signal and the voltage command is switched according to a result of the determination. Therefore, there is an effect that it is possible to realize a further reduction in a torque shock in restarting the AC rotating machine that is in a free-run state.

REFERENCE SIGNS LIST

1 INDUCTION MACHINE (AC ROTATING MACHINE)
2 POWER CONVERTER
3a, 3b, 3c CURRENT DETECTING UNITS
4 THREE-PHASE/DQ CONVERTING UNIT
5 DQ/THREE-PHASE CONVERTING UNIT
6 PHASE CALCULATING UNIT
7 SPEED SWITCHING UNIT
8 VOLTAGE-COMMAND SWITCHING UNIT
9 FIRST CALCULATING UNIT
10 SECOND CALCULATING UNIT
11 CURRENT COMMAND UNIT
12 CONTROL SWITCHING UNIT
13 SECONDARY-d-axis-MAGNETIC-FLUX CALCULATING UNIT 14a, 14b SUBTRACTERS
15 DIVIDER
16 CURRENT CONTROL UNIT
17a, 17b RESISTANCE GAIN UNITS
18, 31a, 31b, 31c, 31d INTEGRATING UNITS
19a, 19b SUBTRACTERS
20a, 20b SWITCHING UNITS (CURRENT SWITCHING UNITS)
21a, 21b, 22a, 22b MULTIPLIERS
23a, 23b INTEGRATING UNITS
24a, 24b, 27 ADDERS
25 VOLTAGE-COMMAND CALCULATING UNIT
26 SLIP-FREQUENCY CALCULATING UNIT
28 MOTOR-FREQUENCY ESTIMATING UNIT
29 ROTOR-ROTATION-FREQUENCY ESTIMATING UNIT
30 MAGNETIC-FLUX ESTIMATING UNIT
32a, 32b SWITCHING UNITS (VOLTAGE SWITCHING UNITS)
35 SWITCHING UNIT
33a, 33b COMPARATORS
34a, 34b AND UNITS
36 SECOND CALCULATING UNIT
37 SPEED CORRECTING UNIT
38 CAPACITOR
50 FIRST VOLTAGE-COMMAND-SWITCHING DETERMINING UNIT
51 SECOND VOLTAGE-COMMAND-SWITCHING DETERMINING UNIT
60 CONTROL UNIT
chsg CONTROL MODE SIGNAL
dpds, dpqs, dpdr, dpqr DIFFERENTIAL VALUES
id d-axis CURRENT DETECTION VALUE (CURRENT INFORMATION)
iq q-axis CURRENT DETECTION VALUE (CURRENT INFORMATION)
iu, iv, iw PHASE CURRENTS (CURRENT INFORMATION)
id*1 d-axis CURRENT COMMAND FOR FIRST CALCULATING UNIT (CURRENT COMMAND VALUE)
iq*1 q-axis CURRENT COMMAND FOR FIRST CALCULATING UNIT (CURRENT COMMAND VALUE)
id*2 d-axis CURRENT COMMAND FOR SECOND CALCULATING UNIT (CURRENT COMMAND VALUE)
iq*2 q-axis CURRENT COMMAND FOR SECOND CALCULATING UNIT (CURRENT COMMAND VALUE)
ids d-axis CURRENT ESTIMATION VALUE
iqs q-axis CURRENT ESTIMATION VALUE
Kp CURRENT CONTROL PROPORTIONAL GAIN
KI CURRENT CONTROL INTEGRATION GAIN
PB OPERATION COMMAND
PMF MODULATION RATIO
pds PRIMARY d-axis MAGNETIC FLUX ESTIMATION VALUE
pqs PRIMARY q-axis MAGNETIC FLUX ESTIMATION VALUE
pdr SECONDARY d-axis MAGNETIC FLUX ESTIMATION VALUE
pqr SECONDARY q-axis MAGNETIC FLUX ESTIMATION VALUE
Vd* d-axis VOLTAGE COMMAND (VOLTAGE COMMAND VALUE)
Vq* q-axis VOLTAGE COMMAND (VOLTAGE COMMAND VALUE)
Vd*1 d-axis VOLTAGE COMMAND CALCULATED BY FIRST CALCULATING UNIT (FIRST VOLTAGE COMMAND VALUE)
Vq*1 q-axis VOLTAGE COMMAND CALCULATED BY FIRST CALCULATING UNIT (FIRST VOLTAGE COMMAND VALUE)
Vd*2 d-axis VOLTAGE COMMAND CALCULATED BY SECOND CALCULATING UNIT (SECOND VOLTAGE COMMAND VALUE)
Vq*2 q-axis VOLTAGE COMMAND CALCULATED BY SECOND CALCULATING UNIT (SECOND VOLTAGE COMMAND VALUE)
φds PRIMARY d-axis MAGNETIC FLUX
φdr SECONDARY d-axis MAGNETIC FLUX
ω1 ANGULAR FREQUENCY OF INDUCTION MACHINE DURING FREE ROTATION (FIRST SPEED)
ω2 INVERTER ANGULAR FREQUENCY (SECOND SPEED)
ωr MOTOR ANGULAR FREQUENCY
ωs SLIP ANGLAR FREQUENCY

DESCRIPTION OF EMBODIMENTS

Embodiments of a power converting apparatus according to the present invention are explained in detail below based on the drawings. The present invention is not limited by the embodiments.

First Embodiment

Figure 1:
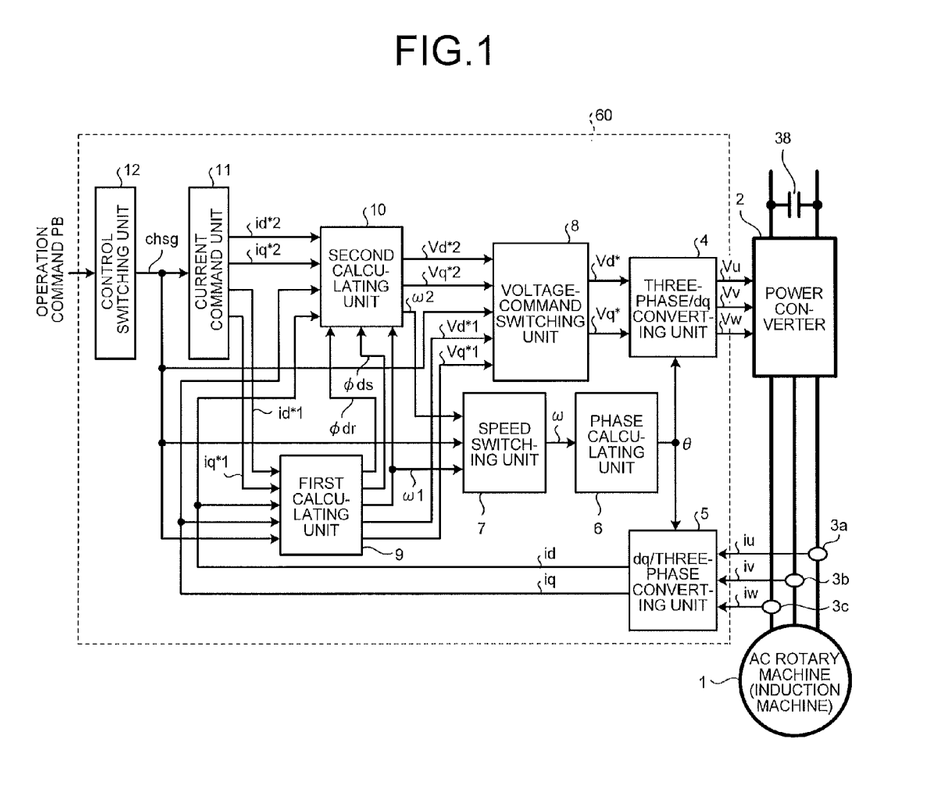
FIG. 1 is a block diagram of a configuration example of a power converting apparatus according to a first embodiment.
Figure 2:
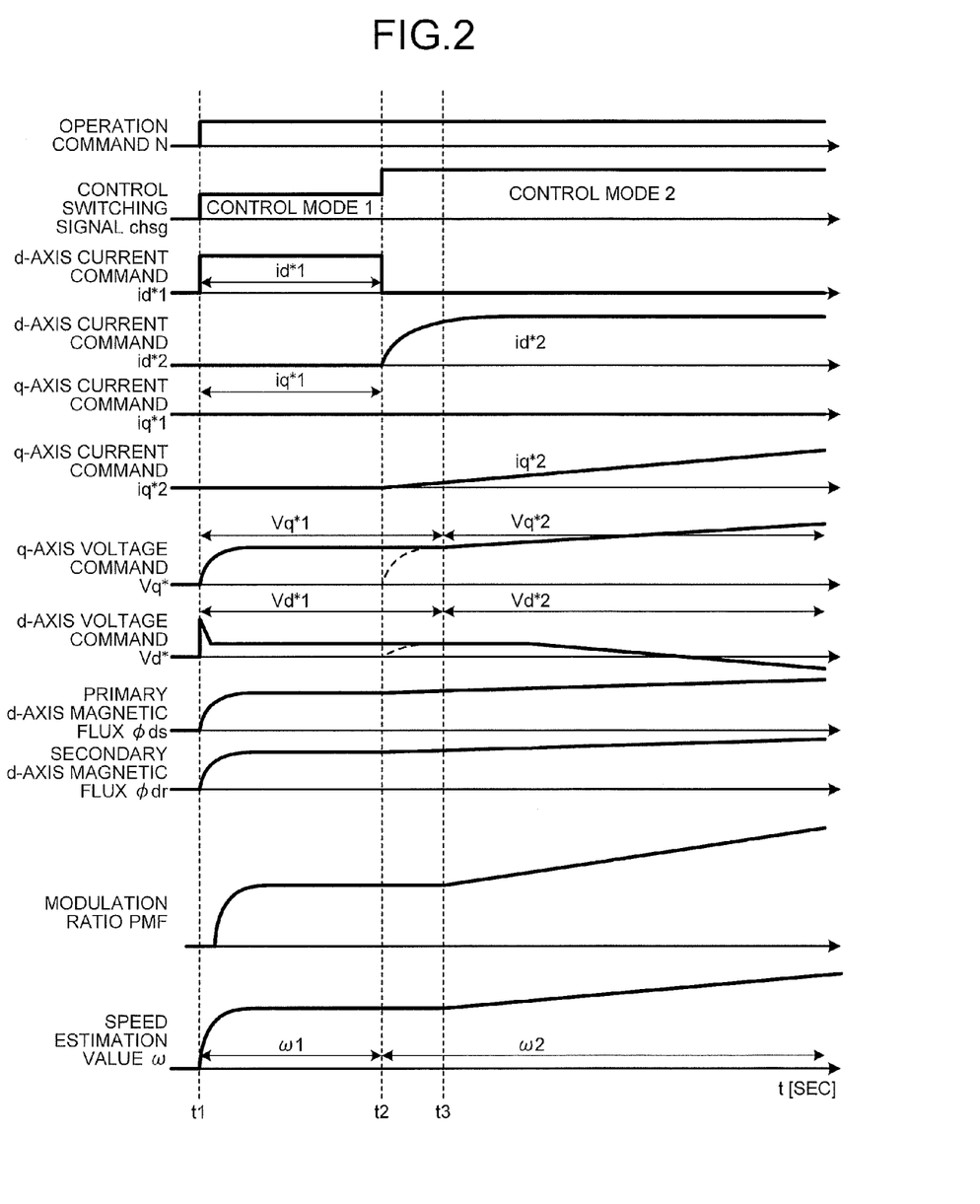
FIG. 2 is a time chart for explaining the operations of signals by the power converting apparatus according to the first embodiment.

FIG. 1 is a block diagram of a configuration example of a power converting apparatus according to a first embodiment. FIG. 2 is a time chart for explaining the operations of signals by the power converting apparatus according to the first embodiment. In FIG. 1, the power converting apparatus includes, as main components, a control switching unit 12 functioning as a control unit 60, a current command unit 11, a first calculating unit 9, a second calculating unit 10, a speed switching unit 7, a voltage-command switching unit 8, a phase calculating unit 6, a three-phase/dq converting unit 4, a dq/three-phase converting unit 5, and a power converter 2.

An induction machine 1, which is an AC rotating machine, is connected to the power converter 2 that converts a direct current into an alternating current having an arbitrary frequency. The power converter 2 applies three-phase voltages to the induction machine 1. Current detecting units 3a, 3b, and 3c on an AC side detect phase currents iu, iv, and iw of three phases generated in the induction machine 1. The phase currents iu, iv, and iw are given to the dq/three-phase converting unit 5.

In FIG. 1, CTs or the like (current transformers) functioning as the current detecting units 3a, 3b, and 3c on the AC side are described on three wires that connect the power converter 2 and the induction machine 1. However, phase currents can be detected using other publicly-known methods. Because a relation iu+iv+iw=0 holds, for example, if the CTs are arranged on two wires of the u phase and the v phase, the phase current iw of the w phase can be calculated from detection currents for the u and v two phases. Therefore, the current detecting unit 3c of the w phase can be omitted.

In the power converting apparatus according to this embodiment, as an example, an effect of the power converting apparatus is explained as an embodiment in which the AC rotating machine is controlled as the induction machine 1. However, it goes without saying that the same effect can be expected even if the induction machine 1 is a synchronous machine. It is also possible to apply the motor converting apparatus according to this embodiment as a power converting apparatus that controls to drive an electromagnetic actuator such as a linear induction motor, a linear synchronous motor, or a solenoid besides the AC rotating machine.

As it is publicly known, when three-phase voltages or three-phase currents are coordinate-transformed onto rotation orthogonal two axes, a control coordinate axis is necessary. The phase of the control coordinate axis, which is a rotation two-axis coordinate, is set to θ based on a predetermined angular frequency ω. The phase θ is a value obtained by integrating the predetermined angular frequency ω with the phase calculating unit 6. The phase calculating unit 6 integrates the predetermined angular frequency ω and outputs the integrated angular frequency ω to the three-phase/dq converting unit 4 and the dq/three-phase converting unit 5 as the phase θ.

The dq/three-phase converting unit 5 converts, based on the phase θ input from the phase calculating unit 6, the phase currents iu, iv, and iw obtained from the current detecting units 3a, 3b, and 3c into a d-axis current detection value id and a q-axis current detection value iq, which are current information. The dq/three-phase converting unit 5 outputs the d-axis current detection value id and the q-axis current detection value iq respectively to the first calculating unit 9 and the second calculating unit 10.

When the power converting apparatus according to this embodiment is mounted on, for example, an electric train, an operation command PB that means a powering command P indicating acceleration, a notch command indicating a brake command B, or the like is input from a driving cab to the control switching unit 12. The control switching unit 12 generates a control mode signal chsg according to the input of the operation command PB.

When the operation command PB is input from the outside, at first, the control switching unit 12 sets the control mode signal chsg as a control mode 1 signal, which is a first control signal. Subsequently, when a predetermined time elapses after the operation command PB is input, the control switching unit 12 sets the control mode signal chsg as a control mode 2 signal, which is a second control signal. The control mode 1 signal functions as a trigger for starting speed estimation of the induction machine 1. The control mode 2 signal functions as a signal for switching control instead of the control mode 1 signal.

The predetermined time is set as time necessary and sufficient for accurately calculating free-run speed (hereinafter referred to as "angular frequency") ω1 of the induction machine 1, which is first speed, taking into account an operation time characteristic of the first calculating unit 9. In this embodiment, time of the control mode 1 signal is time shorter than 0.1 second after the operation command PB is input. Consequently, an effect is obtained that a driver does not worry about a delay in acceleration and deceleration operations of the power converter 2 and the induction machine 1 after inputting the operation command PB. For example, if this time is long, the driver feels a sense of discomfort because the power converter 2 and the induction machine 1 do not accelerate quickly even if the powering command P is input. However, if a control mode 1 is set short, such a sense of discomfort of the driver can be eliminated.

The control mode signal chsg output from the control switching unit 12 is input to each of the current command unit 11, the voltage-command switching unit 8, the speed switching unit 7, and the first calculating unit 9. The current command unit 11 generates a magnetic flux axis current command (hereinafter referred to as "d-axis current command") id*1 and a torque axis current command (hereinafter referred to as "q-axis current command") iq*1, which are current command values corresponding to the induction machine 1, and outputs the magnetic flux axis current command id*1 and the torque axis current command iq*1 in synchronization with the control mode 1 signal. The current command unit 11 generates a magnetic flux axis current command id*2 and a torque axis current command iq*2 and outputs the magnetic flux axis current command id*2 and the torque axis current command id*2 in synchronization with the control mode 2 signal.

In FIG. 2, as the d-axis current command id*1, a predetermined value is output when the control mode signal chsg is in the control mode 1. The d-axis current command id*1 changes to a value zero when the control mode signal chsg changes to the control mode 2. In other words, the predetermined value is output in the control mode 1 and, otherwise, zero is output. As the q-axis current command iq*1, zero is output irrespective of the control modes 1 and 2.

A d-axis current command id*2 is zero when the control mode signal chsg is in the control mode 1. A predetermined value is output when the control mode signal chsg changes to the control mode 2. Like the d-axis current command id*2, a q-axis current command iq*2 is zero when the control mode signal chsg is in the control mode 1. A predetermined value is output when the control mode signal chsg changes to the control mode 2.

(First Calculating Unit)

Figure 3:
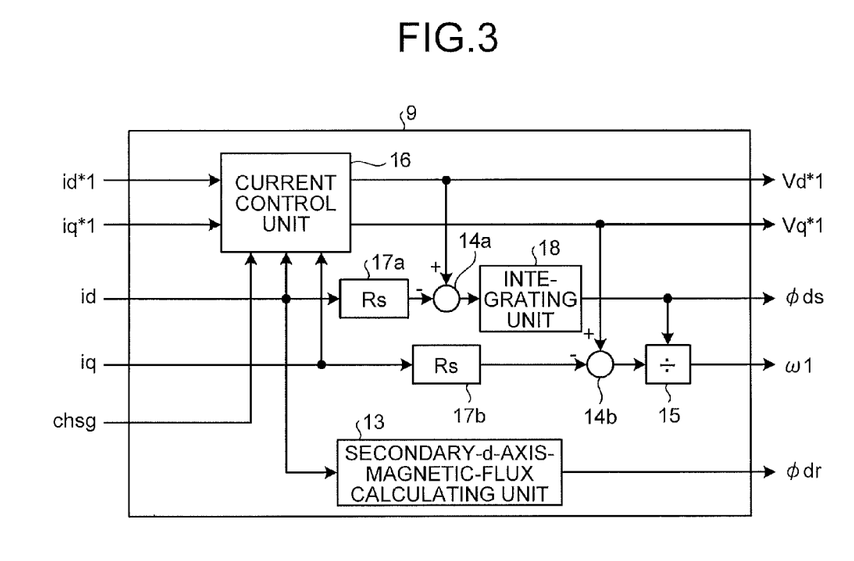
FIG. 3 is a block diagram of the configuration of a first calculating unit.

FIG. 3 is a block diagram of the configuration of the first calculating unit 9. The first calculating unit 9 includes, as main components, a current control unit 16, a secondary-d-axis-magnetic-flux calculating unit 13, resistance gain units (multipliers) 17a and 17b, subtracters 14a and 14b, an integrating unit 18, and a divider 15.

The first calculating unit 9 receives input of the d-axis current command id*1, the q-axis current command iq*1, the d-axis current detection value id, the q-axis current detection value iq, and the control mode signal chsg. The first calculating unit 9 calculates a magnetic flux amplitude based on a value obtained by subtracting a d-axis resistance drop from a d-axis voltage on rotation two axes (d–q axes) that rotate in synchronization with frequencies of output voltages. The first calculating unit 9 divides, by the magnetic flux amplitude, a value obtained by subtracting a q-axis resistance drop from a q-axis voltage and calculates an angular frequency ω1 of the induction machine 1 that is performing free rotation.

The calculation of the angular frequency ω1 by the first calculating unit 9 is explained. If the rotation two axes (d–q axes) are rotating at the predetermined angular frequency ω, a d-axis component and a q-axis component of an armature (primary) magnetic flux of the induction machine 1 can be represented by Formulas (1) and (2).

$$\phi ds = \int (Vd^*1 - Rs \cdot id + \omega \cdot \phi q) \tag{1}$$

$$\phi qs = \int (Vq^*1 - Rs \cdot iq - \omega \cdot \phi d) \tag{2}$$

In the formulas, Rs represents primary resistance. Torque τm output by the induction machine 1 is proportional to the magnitude of an outer product of an armature magnetic flux and an armature current and can be represented by Formula (3). Pm represents the number of pole pairs.

$$\tau m = Pm \cdot (\phi ds \cdot iq - \phi qs \cdot id) \tag{3}$$

When a d-axis direction of the rotation two axes and the direction of the armature magnetic flux coincide with each other, φqs=0. Therefore, when φqs=0 is substituted in Formulas (1) and (2), Formulas (4) and (5) are obtained.

$$\phi ds = \int (Vd*1 - Rs \cdot id) dt \quad (4)$$

$$\omega 1 = \frac{(Vq*1 - Rs \cdot iq)}{\phi ds} \quad (5)$$

Specifically, if the rotation two axes (d–q axes) are rotated in synchronization with the angular frequency ω1 calculated according to Formulas (4) and (5), the d-axis direction of the rotation two axes and the direction of the armature magnetic flux coincide with each other. Therefore, the first calculating unit 9 sets the rotation two axes (d–q axes) to rotate in synchronization with the angular frequency ω1 obtained by performing the calculation of the right side of Formula (4) with the multiplier 17a, the subtracter 14a, and the integrating unit 18 and by performing the calculation of the right side of Formula (5) with the multiplier 17b, the subtracter 14b, and the divider 15. Therefore, the d-axis direction and the direction of the armature magnetic flux can be caused to coincide with each other to keep the q-axis armature magnetic flux φqs=0.

The current control unit 16 has an effect that the q-axis current iq can be kept zero by giving zero to the q-axis current command iq*1; and the speed of the induction machine 1 that is performing free rotation can be estimated without causing unnecessary torque. As the d-axis current command id*1, a predetermined value only has to be given. For example, a stepwise predetermined value can be given or a predetermined value can be given with a primary delay.

When the operation command PB is input and the control mode signal chsg is in the control mode 1, the first calculating unit 9 operates only for a predetermined time (an initial speed estimation time) set in advance. In the induction machine 1 for an electric train, the predetermined time is time equal to or longer than 30 msec and shorter than 100 msec (0.1 second). The lower limit is set to 30 msec because the inventor found that, for example, in the case of a motor for an electric train (rated power: 100 kW to 600 kW), a secondary time constant of the motor is longer than 300 msec and, when a current control response of the current control unit 16 in the first calculating unit 9 is taken into account, only a control response longer than 1/10 of the secondary time constant 300 msec can be realized. Therefore, from the secondary time constant 300 msec of the motor, the initial speed estimation time equal to or shorter than 30 msec is necessary.

A characteristic of the first calculating unit 9 is that speed (the number of revolutions) of the induction machine 1 that is performing free-run can be accurately detected according to the predetermined time set in this way. An effect can also be obtained that, by performing control in time shorter than 0.1 second, the driver does not have a sense of discomfort about acceleration and deceleration in an initial speed estimation period.

Figure 4:
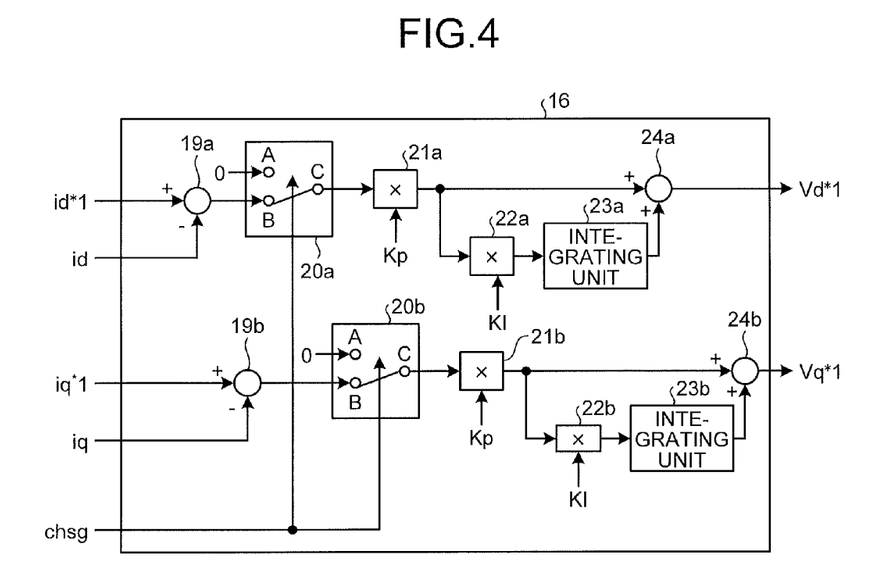
FIG. 4 is a block diagram of the configuration of a current control unit.

FIG. 4 is a block diagram of the configuration of the current control unit 16. The current control unit 16 includes subtracters 19a and 19b, switching units 20a and 20b, which are current switching units, multipliers 21a and 21b that perform multiplication by a current control proportional gain Kp, multipliers 22a and 22b that perform multiplication by a current control integration gain KI, and integrating units 23a and 23b.

The current control unit 16 receives input of the d-axis current command id*1, the q-axis current command iq*1, the d-axis current detection value id, the q-axis current detection value iq, and the control mode signal chsg and calculates a q-axis voltage command Vq*1 and a q-axis voltage command Vq*1.

When the control mode signal chsg is in the control mode 1, the switching units 20a and 20b connect a contact B and a contact C. When the control mode signal chsg is in a mode other than the control mode 1, the switching units 20a and 20b connect a contact A and the contact C. For example, zero is input to the contact A as a value other than id*1 and iq*1. Therefore, when the control mode signal chsg shifts from the control mode 1 to the control mode 2, as values of the d-axis voltage command Vd*1 and the q-axis voltage command Vq*1, values of the integrating units 23a and 23b are output. In other words, values accumulated in the integrating units 23a and 23b are output as they are from the current control unit 16 via adders 24a and 24b. Note that a value input to the contact A is not limited to zero.

In FIG. 3, the secondary-d-axis-magnetic-flux calculating unit 13 of the first calculating unit 9 calculates a secondary d-axis magnetic flux φdr from Formula (6) shown below. Rr represents secondary resistance, M represents mutual inductance, and Lr represents secondary inductance.

$$\phi_{dr} = \frac{M}{1 + \frac{Lr}{Rr}s} i_{ds} \quad (6)$$

Means for shifting first voltage command values (Vd*1 and Vq*1), which are outputs of the first calculating unit 9, to second voltage command values (Vd*2 and Vq*2), which are outputs of the second calculating unit 10, when the control mode signal chsg shifts from the control mode 1 to the control mode 2, i.e., after the speed of the induction machine 1 that is performing free-run is accurately detected by the first calculating unit 9, is explained.

(Second Calculating Unit)

Figure 5:
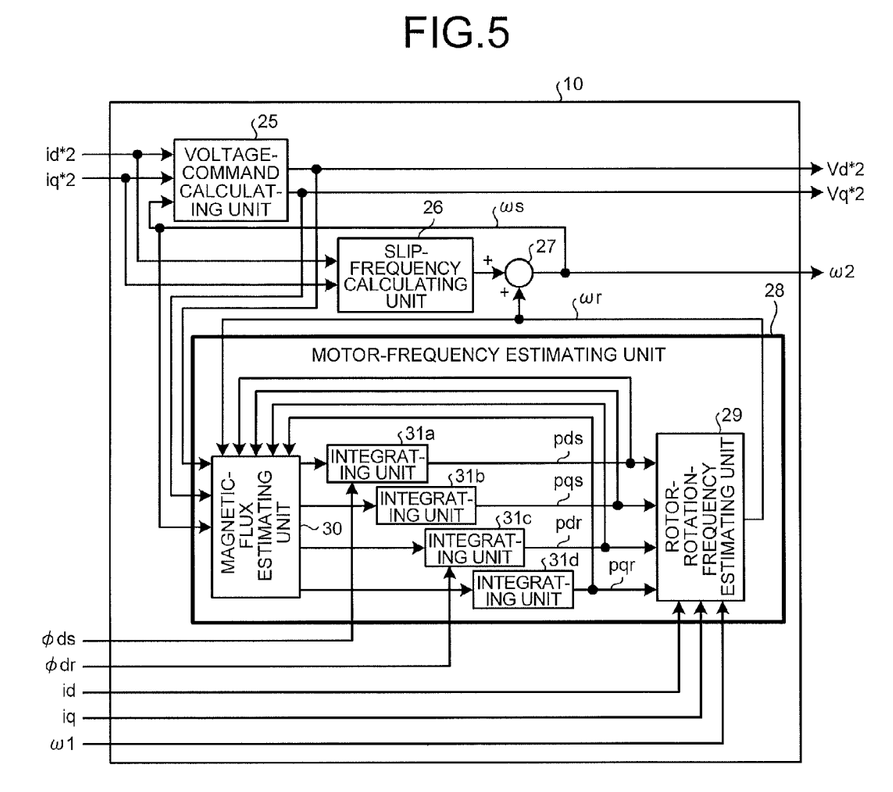
FIG. 5 is a block diagram of the configuration of a second calculating unit.

FIG. 5 is a block diagram of the configuration of the second calculating unit 10. The second calculating unit 10 includes, as main components, a voltage-command calculating unit 25, a slip-frequency calculating unit 26, and a motor-frequency estimating unit 28.

The voltage-command calculating unit 25 calculates a d-axis voltage command Vd*2 and a q-axis voltage command Vq*2 using the following Formulas (7) and (8) as vector control.

$$Vd*2 = Rs \cdot id*2 - \omega 2 \cdot \sigma \cdot Ls \cdot iq*2 \quad (7)$$

$$Vq*2 = Rs \cdot iq*2 + \omega 2 \cdot Ls \cdot is*2 \quad (8)$$

∴ leakage coefficient σ=1−M²/(Ls·Lr)

Rs: primary resistance, Ls: primary inductance, id*2: d-axis current command, iq*2: q-axis current command, M: mutual inductance, Lr: secondary inductance, ω2: inverter angular frequency The slip-frequency calculating unit 26 receives input of the d-axis current command id*2 and the q-axis current command iq*2 and calculates a slip angular frequency ωs using the following Formula (9) as vector control from a motor constant.

$$\omega s = \frac{iq*2}{id*2} \times \frac{Rr}{Lr} \quad (9)$$

An adder 27 adds up the slip angular frequency ωs calculated by the slip-frequency calculating unit 26 and a motor angular frequency ωr explained later. The motor-frequency estimating unit 28 includes a magnetic-flux estimating unit 30, integrating units 31a, 31b, 31c, and 31d, and a rotor-rotation-frequency estimating unit 29.

The magnetic-flux estimating unit 30 receives input of the d-axis voltage command Vd*2 and the q-axis voltage command Vq*2 and further receives, as feedback signals, input of a primary d-axis magnetic flux estimation value pds, a primary q-axis magnetic flux estimation value pqs, a secondary d-axis magnetic flux estimation value pdr, a secondary q-axis magnetic flux estimation value pqr, an inverter angular frequency ω2, which is second speed, and a motor angular frequency ωr, which is an output of the rotor-rotation-frequency estimating unit 29. The magnetic-flux estimating unit 30 calculates, based on these inputs, differential values dpds, dpqs, dpdr, and dpqr according to Formula (10).

$$\begin{cases} dpds = a11 \times pds + \omega 2 \times pqs + a12 \times pdr + Vd*2 \\ dpqs = -\omega 2 \times pds + a11 \times pqs + a12 \times pqr + Vq*2 \\ dpdr = a21 \times pds + a22 \times pdr + (\omega 2 - \omega r) \times pqr \\ dpqr = a21 \times pqs - (\omega 2 - \omega r) \times pdr + a22 \times pqr \end{cases} \quad (10)$$

$$a11 = \frac{Lr \times Rs}{Ls \times Lr - M^2}, \; a12 = \frac{M \times Rs}{Ls \times Lr - M^2},$$

$$a21 = \frac{M \times Rr}{Ls \times Lr - M^2}, \; a22 = -\frac{Ls \times Rr}{Ls \times Lr - M^2}$$

The integrating unite 31a, 31b, 31c, and 31d integrate the differential values dpds, dpqs, dpdr, and dpqr of the magnetic flux estimation values and calculate the magnetic flux estimation values pds, pqs, pdr, and pqr according to the following Formula (11).

$$\begin{cases} pds = \int dpds \cdot dt + \phi ds \\ pqs = \int dpqs \cdot dt + 0 \\ pdr = \int dpdr \cdot dr + \phi dr \\ pqr = \int dpqr \cdot dt + 0 \end{cases} \quad (11)$$

As indicated by Formula (11), the primary d-axis magnetic flux estimation value pds has, as an initial value, a primary d-axis magnetic flux φds calculated by the first calculating unit 9. The secondary magnetic flux estimation value pdr has, as an initial value, secondary d-axis magnetic flux φdr calculated by the first calculating unit 9. Consequently, an effect is obtained that the behavior of the motor angular frequency ωr calculated by the motor-frequency estimating unit 28 can be quickly caused to coincide with an actual motor angular frequency.

The rotor-rotation-frequency estimating unit 29 receives input of the magnetic flux estimation values pds, pqs, pdr, and pqr and calculates a d-axis current estimation value ids and a q-axis current estimation value iqs according to Formula (12).

$$\begin{cases} ids = \frac{Lr \times pds - M \times pdr}{Ls \times Lr - M^2} \\ iqs = \frac{Lr \times pqs - M \times pqr}{Ls \times Lr - M^2} \end{cases} \quad (12)$$

The rotor-rotation-frequency estimating unit 29 calculates a d-axis current error vector eid and a q-axis current error vector eiq from the current estimation values ids and iqs of the dq axes and the current detection values id and iq of the dq axes according to Formula (13).

$$\begin{cases} eid = ids - id \\ eiq = iqs - iq \end{cases} \quad (13)$$

The rotor-rotation-frequency estimating unit 29 receives input of the current error vectors eid and eiq of the dq axes and the secondary d-axis magnetic flux estimation value pdr and the secondary q-axis magnetic flux estimation value pqr and calculates a rotor rotation acceleration and deceleration calculation value aωr according to Formula (14), where kap represents rotor rotation acceleration and deceleration calculation proportional gain, Tapi represents rotor rotation acceleration and deceleration integration time constant, and s represents Laplacean operator.

$$a\omega r = kap\left(1 + \frac{1}{Tapi \cdot s}\right) \cdot \frac{pdr \times eid - pqr \times eiq}{pdr^2 + pqr^2} \quad (14)$$

The rotor-rotation-frequency estimating unit 29 integrates the rotor rotation acceleration and deceleration calculation value aωr calculated according to Formula (14) and calculates the motor angular frequency ωr, which is calculated by the motor-frequency estimating unit 28, according to Formula (15).

$$\omega r = \int a\omega r \cdot dt + \omega 1 \quad (15)$$

As in the calculation of the magnetic flux estimation values, the motor angular frequency ωr has, as an initial value, the angular frequency ω1 calculated by the first calculating unit 9. The calculated motor angular frequency ωr is added up with the slip angular frequency ωs by the adder 27 as indicated by Formula (16) and an inverter angular frequency ω2 is obtained.

$$\omega 2 = \omega r + \omega s \quad (16)$$

(Voltage-Command Switching Unit)

Figure 6:
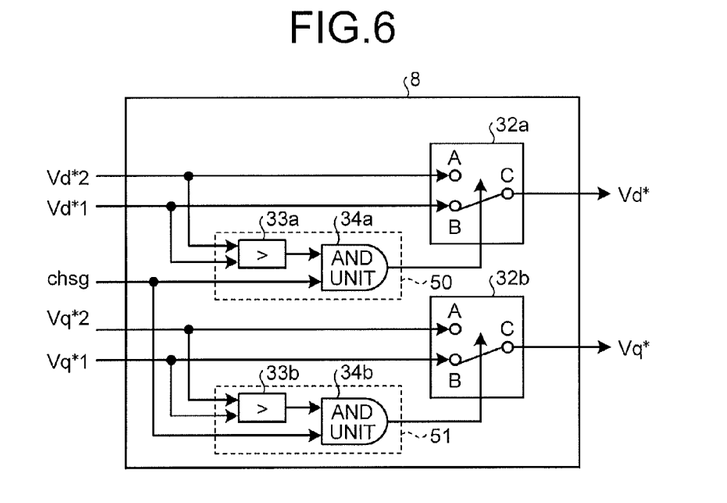
FIG. 6 is a block diagram of the configuration of a voltage-command switching unit.

FIG. 6 is a block diagram of the configuration of the voltage-command switching unit 8. The voltage-command switching unit 8 includes, as main components, a first voltage-command-switching determining unit 50, a second voltage-command-switching determining unit 51, and switching units 32a and 32b, which are voltage switching units. The first voltage-command-switching determining unit 50 includes a comparator 33a and an logical product unit or AND unit 34a. The second voltage-command-switching determining unit 51 includes a comparator 33b and an logical product unit 34b.

The voltage-command switching unit 8 receives input of the d-axis voltage command Vd*1 and the q-axis voltage command Vq*1 calculated by the first calculating unit 9, the d-axis voltage command Vd*2 and the q-axis voltage command Vq*2 calculated by the second calculating unit 10, and the control mode signal chsg.

This voltage-command switching unit 8 is a characteristic of this embodiment. As shown in FIG. 2, even if the control mode signal chsg is switched from the control mode 1 to the control mode 2, if Vd*2 is smaller than Vd*1, the voltage-command switching unit 8 sets Vd*1 as a d-axis voltage command Vd*. This operation is realized by the comparator 33a, the logical product unit 34a, and the switching unit 32a.

The same operation is performed concerning the q-axis voltage commands Vq*2, Vq*1, and Vq+ as well.

This operation is explained in detail using FIG. 2. For example, when the comparator 33b and the logical product unit 34b determine that a value of Vq*2 is smaller than Vq*1 at a point (t2) when the control mode 1 changes to the control mode 2, the switching unit 32b connects the contact B and the contact C and outputs Vq*1 as Vq*. At a point (t3) when the value of Vq*2 substantially coincides with Vq*1, the switching unit 32b connects the contact A and the contact C and outputs Vq*2 as Vq*. In FIG. 2, a change in a modulation ratio PMF indicates the magnitude of an inverter output voltage command as a ratio to a maximum voltage that an inverter can output. However, the modulation ratio PMF changes substantially the same as the q-axis voltage command Vq*.

(Speed Switching Unit)

Figure 7:
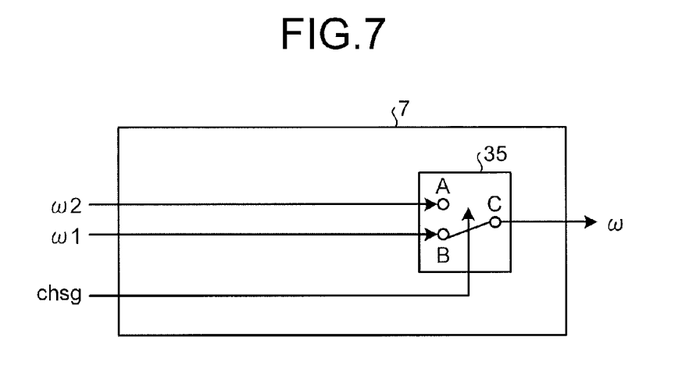
FIG. 7 is a block diagram of the configuration of a speed switching unit.

FIG. 7 is a block diagram of the configuration of the speed switching unit 7. The speed switching unit 7 includes a switching unit 35 that receives input of the angular frequency $\omega 1$ calculated by the first calculating unit 9, the inverter angular frequency $\omega 2$ calculated by the second calculating unit 10, and the control mode signal chsg.

The switching unit 35 connects the contact A and the contact C when the control mode signal chsg is switched from the control mode 1 to the control mode 2. As a result, the inverter angular frequency $\omega 2$ calculated by the second calculating unit 10 changes to $\omega$. $\omega$ is input to the phase calculating unit 6.

As explained above, the power converting apparatus according to this embodiment includes the first calculating unit 9 that calculates, based on electric currents detected by the current detecting units 3a to 3c, the q-axis voltage command Vq*1 and the d-axis voltage command Vd*1, which are speed information of the induction machine 1; and the second calculating unit 10 that sets, as initial values, the primary d-axis magnetic flux $\phi$ds and the secondary d-axis magnetic flux $\phi$dr calculated by the first calculating unit 9 and the speed estimation value $\omega 1$; and outputs the q-axis voltage command Vq*2 and the d-axis voltage command Vd*2 and the inverter angular frequency $\omega 2$. Therefore, it is possible to quickly cause the behavior of a motor angular frequency to coincide with an actual motor angular frequency. Further, the power converting apparatus includes the voltage-command switching unit 8 that determines, according to the control mode signal chsg, values of the q-axis voltage command Vq*1 and the q-axis voltage command Vq*2 and values of the d-axis voltage command Vd*1 and the d-axis voltage command Vd*2 and outputs a voltage command; and the speed switching unit 7 that switches the speed estimation value $\omega 1$ or the inverter angular frequency $\omega 2$ according to the control mode signal chsg and outputs the speed estimation value $\omega 1$ or the inverter angular frequency $\omega 2$ to the phase calculating unit 6. Therefore, compared with the related art, it is possible to reduce a torque shock at the time when the induction machine 1 is restarted. Further, the power converting apparatus includes the control switching unit 12 in which time of a control mode 1 signal is set to time equal to or shorter than 0.1 second. Therefore, because a delay until the power converter 2 and the induction machine 1 start acceleration and deceleration operations after the operation command PB is input, is suppressed, it is possible to eliminate a sense of discomfort for the driver.

Second Embodiment

Figure 8:
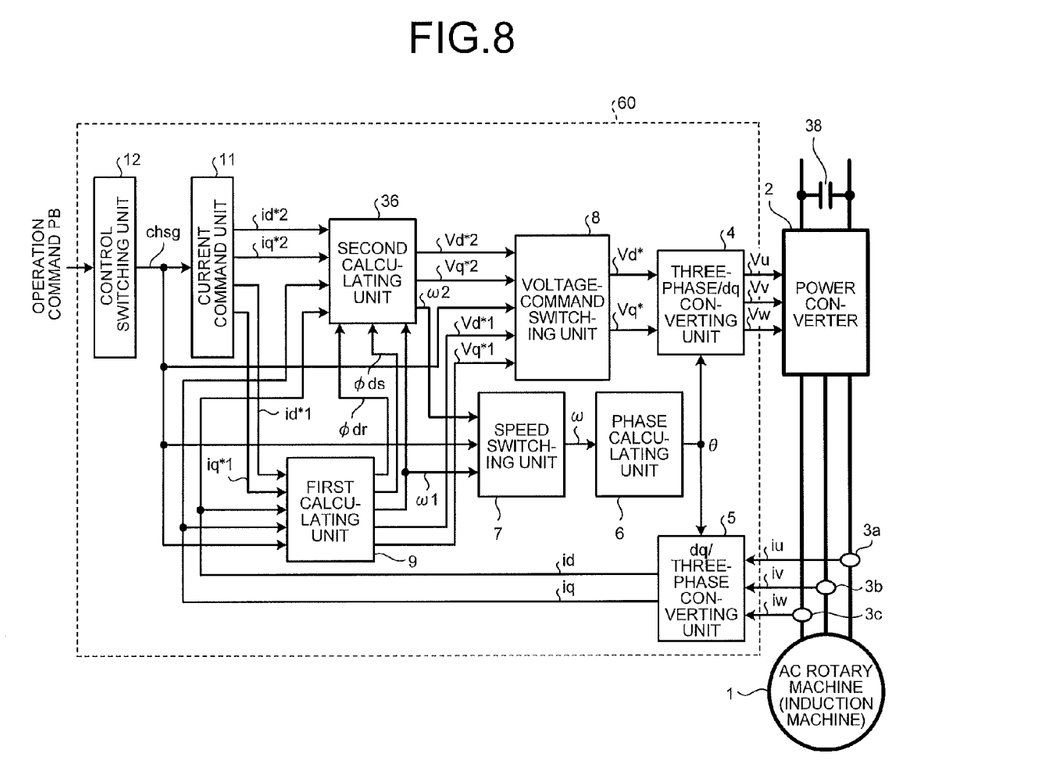
FIG. 8 is a diagram of a configuration example of a power converting apparatus according to a second embodiment.

A power converting apparatus according to a second embodiment is configured to be capable of calculating a speed estimation value higher than an actual motor frequency and prevent a voltage rise on a DC side by giving a correction gain, which is a predetermined gain, to a value of the speed estimation value $\omega 1$ calculated by the first calculating unit 9. The configuration and the operation of a control device of the power converting apparatus according to this embodiment are explained below. Components same as those in the first embodiment are denoted by the same reference numerals and signs and explanation of the components is omitted. Only differences from the first embodiment are explained.

Figure 9:
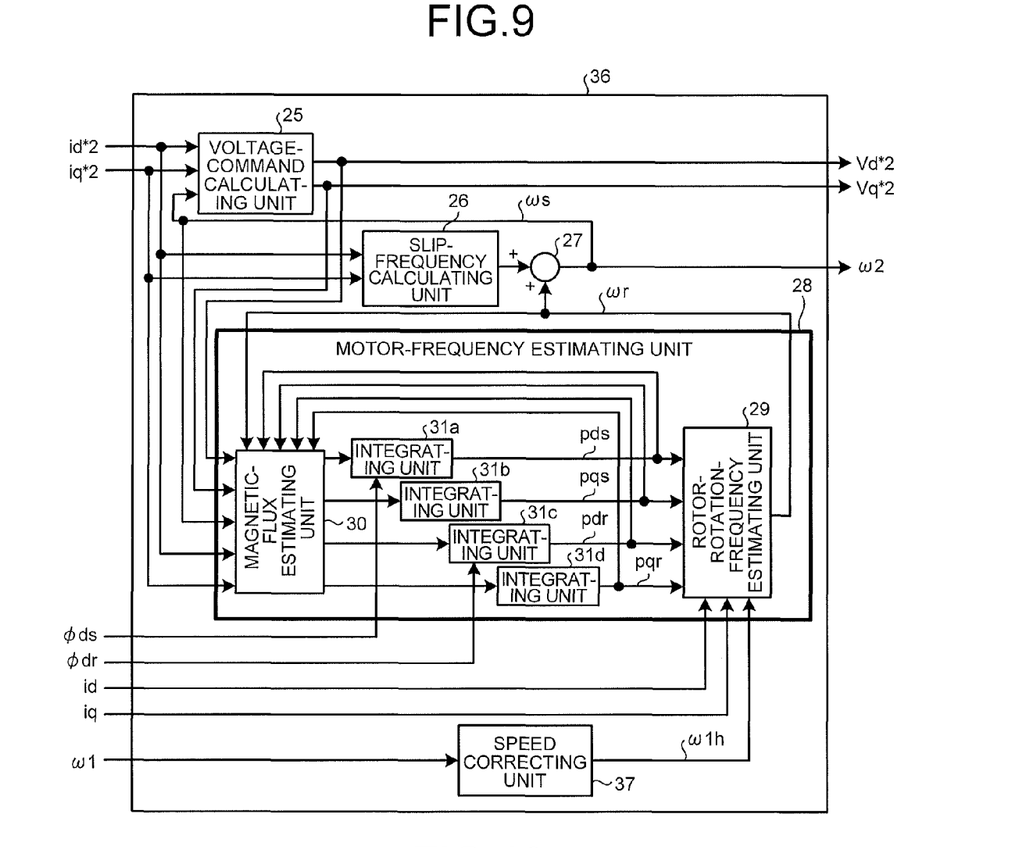
FIG. 9 is a diagram of an example of the configuration of a second calculating unit according to the second embodiment.

FIG. 8 is a block diagram of a configuration example of a power converting apparatus according to the second embodiment. FIG. 9 is a block diagram of the configuration of a second calculating unit 36 according to the second embodiment. The second calculating unit 36 includes a speed correcting unit 37 that is a table for multiplying the speed estimation value $\omega 1$, which is calculated by the first calculating unit 9, with a correction gain and setting an angular frequency $\omega 1h$ multiplied with the correction gain as an initial value of the speed of the rotor-rotation-frequency estimating unit 29.

A reason for giving the correction gain to the speed estimation value $\omega 1$ is explained below. If $\omega 1$ estimated by the first calculating unit 9 is estimated as indicated by a solid line from t1 to t2 in FIG. 2, if a value of this $\omega 1$ (the solid line) is smaller than actual rotating speed of the induction machine 1, the induction machine 1 changes to a regeneration mode. When the induction machine 1 changes to the regeneration mode in this way, regenerated power is applied to the power converter 2 and the voltage of a capacitor 38 disposed on the primary side of the power converter 2 rises. As means for preventing such a situation, the speed correcting unit 37 multiplies the speed estimation value $\omega 1$ with a predetermined correction gain to obtain $\omega 1h$ according to a value of the speed estimation value $\omega 1$ calculated by the first calculating unit 9.

Figure 10:
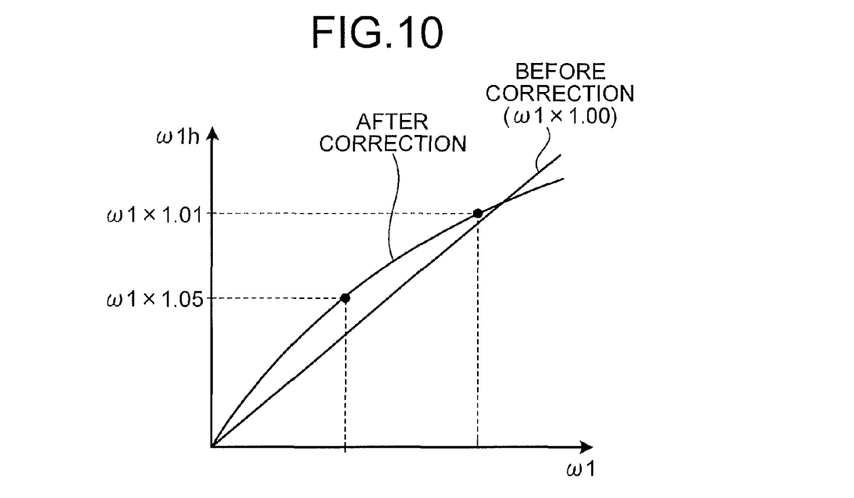
FIG. 10 is a graph for explaining the operation of a speed correcting unit.

FIG. 10 is a graph for explaining the operation of the speed correcting unit 37. The horizontal axis of the graph indicates the speed estimation value $\omega 1$ calculated by the first calculating unit 9 and the vertical axis indicates the speed estimation value $\omega 1h$ after correction. In FIG. 10, a characteristic obtained when the speed estimation value $\omega 1$ is multiplied by a 1.00-times gain and a characteristic obtained when the speed estimation value $\omega 1$ is multiplied by the predetermined correction gain are shown.

In a region where a motor frequency is low, the speed correcting unit 37 gives, for example, a 1.05-times gain to the speed estimation value col. In a region where the motor frequency is high, the speed correcting unit 37 gives, for example, 1.01-times gain to the speed estimation value col. In this way, the speed correcting unit 37 is configured such that a gain given to the speed estimation value $\omega 1$ is changed according to a value of the motor frequency. The values of the gain indicate examples and are not limited to these values.

As explained above, the power converting apparatus according to this embodiment includes the speed correcting unit 37 that adds a predetermined gain to an initial value set in the rotor-rotation-frequency estimating unit 29. Therefore, because a value higher than an actual motor frequency of the induction machine 1 can be set, regenerated power is not applied to the capacitor 38 and a voltage rise on a DC side can be prevented.

The second calculating unit 10 can be configured to calculate at least one of the d-axis magnetic fluxes ($\phi$ds and $\phi$dr) and the angular frequency $\omega 1$ as an initial value. The power converting apparatuses explained in the first and second embodiments indicate examples of contents of the present invention. It goes without saying that the power converting apparatuses can be combined with other publicly-known technologies or can be configured to be changed by, for example, omitting a part thereof without departing from the spirit of the present invention.

INDUSTRIAL APPLICABILITY

As explained above, the present invention can be applied to a power converting apparatus that can restart an AC rotating machine without using a speed detector. In particular, the present invention is useful as an invention for further reducing a torque shock and a voltage rise on a DC side in restarting the AC rotating machine that is in a free-run state.

The invention claimed is:

1. A power converting apparatus including: a power converter that converts a DC voltage into an AC voltage and applies the AC voltage to an AC rotating machine; and a control unit that controls the power converter based on an operation command from an outside,
the power converting apparatus comprising:
a first calculating unit that calculates and outputs, from current information detected by the AC rotating machine and a current command value based on the operation command, a first voltage command value to the power converter, a magnetic flux of the AC rotating machine, and first speed, which is free-run speed of the AC rotating machine;
a second calculating unit that sets, as an initial value, at least one of the first speed and the magnetic flux of the AC rotating machine input from the first calculating unit and calculates and outputs a second voltage command value to the power converter and second speed, which is driving speed of the AC rotating machine;
a control switching unit that generates and outputs a first control signal when the operation command is input and generates and outputs a second control signal instead of the first control signal after a predetermined time from the input of the operation command; and
a speed switching unit that switches the first speed to the second speed at a point when the first control signal is switched to the second control signal.

2. The power converting apparatus according to claim 1, wherein
the first calculating unit calculates and outputs, based on the first control signal, the first voltage command value, the magnetic flux of the AC rotating machine, and the first speed, and
the second calculating unit calculates and outputs, based on the second control signal, the second voltage command value and the second speed.

3. The power converting apparatus according to claim 1, further comprising a voltage-command-value switching unit that calculates and outputs, based on the first voltage command value and the second voltage command value, a voltage command value of the power converter.

4. The power converting apparatus according to claim 3, wherein the voltage-command switching unit includes:
a voltage-command-switching determining unit that determines whether the second voltage command value and the first voltage command value substantially coincide with each other; and
a voltage switching unit that switches the first voltage command value to the second voltage command value according to a result of the determination.

5. The power converting apparatus according to claim 1, wherein the first calculating unit includes a current control unit that generates and outputs the first voltage command value from the first control signal, current information detected by the AD rotary machine, and a current command value based on the operation command.

6. The power converting apparatus according to claim 5, wherein the current control unit includes a current switching unit that switches the current command value to zero and outputs zero when the first control signal is switched to the second control signal.

7. The power converting apparatus according to claim 1, wherein the first calculating unit calculates a q-axis magnetic flux as zero in calculating the d-axis magnetic flux.

8. The power converting apparatus according to claim 1, wherein the predetermined time is equal to or shorter than 0.1 second.

9. A power converting apparatus including: a power converter that converts a DC voltage into an AC voltage and applies the AC voltage to an AC rotating machine; and a control unit that controls the power converter based on an operation command from an outside,
the power converting apparatus comprising:
a first calculating unit that calculates and outputs, from current information detected by the AC rotating machine and a current command value based on the operation command, a first voltage command value to the power converter, a magnetic flux of the AC rotating machine, and first speed, which is free-run speed of the AC rotating machine;
a second calculating unit that sets, as an initial value, at least one of the first speed and the magnetic flux of the AC rotating machine input from the first calculating unit and calculates and outputs a second voltage command value to the power converter and second speed, which is driving speed of the AC rotating machine; and
a voltage-command switching unit that switches the first voltage command value to the second voltage command value at a point when the second voltage command value and the first voltage command value substantially coincide with each other.

10. The power converting apparatus according to claim 9, wherein the voltage-command switching unit includes:
a voltage-command-switching determining unit that determines whether the second voltage command value and the first voltage command value substantially coincide with each other; and
a voltage switching unit that switches the first voltage command value to the second voltage command value according to a result of the determination.

11. The power converting apparatus according to claim 9, wherein the first calculating unit calculates a q-axis magnetic flux as zero in calculating the d-axis magnetic flux.

12. A power converting apparatus including: a power converter that converts a DC voltage into an AC voltage and applies the AC voltage to an AC rotating machine; and a control unit that controls the power converter based on an operation command from an outside,
the power converting apparatus comprising:
a first calculating unit that calculates and outputs, from current information detected by the AC rotating machine and a current command value based on the operation command, a first voltage command value to the power converter, a magnetic flux of the AC rotating machine, and first speed, which is free-run speed of the AC rotating machine;
a second calculating unit that sets, as an initial value, at least one of the first speed and the magnetic flux of the AC rotating machine input from the first calculating unit and calculates and outputs a second voltage command value to the power converter and second speed, which is driving speed of the AC rotating machine, wherein the second calculating unit includes a speed correcting unit that multiplies the first speed with a predetermined gain.

* * * * *